United States Patent [19]

Hiiro

[11] Patent Number: 4,855,761
[45] Date of Patent: Aug. 8, 1989

[54] LIGHT BEAM RECORDER WITH AN AFOCAL ANAMORPHIC OPTICAL AMPLIFIER

[75] Inventor: Hiroyuki Hiiro, Kanagawa, Japan

[73] Assignee: Fuji Photo Film Co., Ltd., Kanagawa, Japan

[21] Appl. No.: 174,558

[22] Filed: Mar. 29, 1988

[30] Foreign Application Priority Data

Mar. 30, 1987 [JP] Japan .................................. 62-77091

[51] Int. Cl.[4] ......................... G01D 9/42; G02B 26/08
[52] U.S. Cl. ...................................... 346/108; 350/6.6
[58] Field of Search .................. 346/108; 350/6.5, 6.7, 350/6.8, 6.6, 6.9, 6.91

[56] References Cited

U.S. PATENT DOCUMENTS

4,084,881  4/1978  Hirabayashi ........................ 350/6.8
4,253,724  3/1981  Minoura .............................. 350/6.8

Primary Examiner—E. A. Goldberg
Assistant Examiner—Mark Reinhart
Attorney, Agent, or Firm—Sughrue, Mion, Zinn, Macpeak & Seas

[57] ABSTRACT

A recording apparatus for recording information with a light beam, having a beam deflector for deflecting the light beam in the direction of main scan by a sine wave oscillation. The deflection angle of the light beam from the beam deflector is amplified in the direction of the main scan by means of an afocal anamorphic optical system. This arrangement makes it possible to effect the main scan with the light beam which has been deflected by the light deflector while the angle of oscillation of the light deflector is within a smallest region.

18 Claims, 10 Drawing Sheets

FIRST PRIMARY SURFACE   SECOND PRIMARY SURFACE

LIGHT BEAM RECORDER WITH AN AFOCAL ANAMORPHIC OPTICAL AMPLIFIER

BACKGROUND OF THE INVENTION

1. Field of the Invention

The present invention relates to a recording apparatus and, more particularly, to an apparatus for recording information such as letters and characters by means of a light beam.

2. Description of the Related Art

Recording apparatus have been known which are capable of recording letters and other information on a recording medium by means of a light beam. An example of such apparatus is laser computer output microfilmer which is capable of scanning a recording material such as a microfilm with a laser beam in accordance with, for example, information output from a computer, so as to directly record the information in the form of, for example, letters on the recording material. Such a laser computer output microfilmer is disclosed, for example, in U.S. Pat. No. 4,293,202. This apparatus has an argon laser capable of emitting a laser beam, a photomodulator for effecting photo-modulation of the laser beam in accordance with the letter information, a rotary polygon mirror for deflecting the modulated laser beam in the direction of the main scan, and a galvanometer having a deflection mirror for deflecting the light reflected by the polygon mirror in the direction of sub-scan. The rotary polygon mirror and the galvanometer in cooperation deflects the laser beam from the photomodulator both in the directions of main scan and sub-scan so that the light beam scans the recording material through a scanning lens thereby recording information in the form of, for example, letters on the recording material. The polygon mirror is driven by a motor so as to rotate at a constant speed. It is often experienced that the mirror surface of the polygon mirror is tilted or oscillated due to, for example, inclination of the shaft of the motor, with the result that the scanning beam oscillates in the direction of the sub-scan to cause a fluctuation in the recording density in the direction of the sub-scan. The described known apparatus is therefore required to be equipped with a correcting optical system for eliminating the unevenness of the recording density in the direction of the main scan. The galvanometer is adapted to control the rotation angle of the deflection mirror in accordance with synchronizing signal which is formed upon detection of a reference light beam which is first applied along the same path as the laser beam and then shunted therefrom.

The laser computer output microfilmer mentioned before, as an example of the recording apparatus which makes use of a light beam, essentially requires a correction optical system because of the use of the rotary polygonal mirror, and is required to have helium-neon laser in order to generate the reference light beam, with the result that the production cost is raised.

It would be possible to use a resonance reflection mirror known as "resonant scanner" in place of the rotary polygonal mirror so as to overcome the above-described problems, thus eliminating necessity for the correction optical system. Since the resonance deflection mirror resonates by a sine-wave oscillation, the speed of oscillation is high in the region near the maximum oscillation angle than in the region near the minimum oscillation angle, so that the scanning speed varies oscillatingly. Therefore, when the recording is effected by means of dots, the pitch of the dots is regularly changed to cause a distortion of the recorded information. The distortion of the dot image is serious particularly when information in the form of letters is recorded on the microfilm by dots because in such a case a specifically high degree of resolution on the order of, for example, 3360 dots/7.2 mm is required.

SUMMARY OF THE INVENTION

Accordingly, an object of the present invention is to provide an inexpensive apparatus for recording information with a light beam which is improved to suppress the tendency for the recorded image to be distorted.

To this end, according to the present invention, there is provided a recording apparatus for recording information with a light beam, comprising: a beam source for emitting the light beam; light deflecting means for deflecting the light beam from the beam source in the direction of main scan by sine wave oscillation; an afocal anamorphic optical system for amplifying, in the direction of the main scan, the deflection angle of the light beam deflected by the deflecting means; and a scanning lens through which the light beam from the afocal anamorphic optical system is focused on a recording material.

In operation, the light beam emitted from the light beam source is deflected in the direction of the main scan by the light deflecting means which oscillates in a sine wave form.

Representing the diameters of the beam incident upon an afocal anamorphic optical system and the beam emanating therefrom by $D_1$ and $D_2$, respectively, and representing the angles of inclination of the incident beam and emanating beam with respect to the optical axis by $\omega_1$ and $\omega_2$, respectively, a relationship as expressed by the following formula (1) exists between the inclination angles and the beam diameters.

$$\omega_2/\omega_1 = D_1/D_2 \tag{1}$$

From formula (1) above, the product of the beam diameter and the beam inclination angle on the incident side of the afocal anamorphic optical system is equal to that on the emanating side of the same optical system. This means that the beam inclination angle becomes greater as the beam diameter gets smaller. By making an efficient use of this principle, it is possible to obtain a large angle $\omega_2$ of the emanating beam with respect to the optical axis, thus obtaining a large deflection angle of the afocal anamorphic optical system, even when the angle $\omega_1$ of the incident beam with respect to the optical axis is small. Thus, the light beam reflected by the light deflection means is incident to the afocal anamorphic optical system which in turn serves to increase the deflection angle in the direction of the main scan. The light beam which has passed the afocal anamorphic optical system forms an image on the recording material.

The light beam is modulated in accordance with the recording information and the sub-scan is effected by moving the recording material in the direction of the sub-scan or by making use of another light deflection means which deflects the light beam in the direction of the sub-scan, whereby the information is recorded on the recording material.

According to the present invention, the deflection angle of the light beam is amplified in the direction of the main scan by the afocal anamorphic optical system. It is therefore possible to effect the main scan with the light beam which is reflected when the oscillation angle is near the minimum value and, hence, which contains only a small distortion component. In other words, the main scan can be effected without using the light beam which has been reflected by the deflection means when the oscillation angle is near the maximum angle and, hence, which has a large distortion component.

Figure 7:
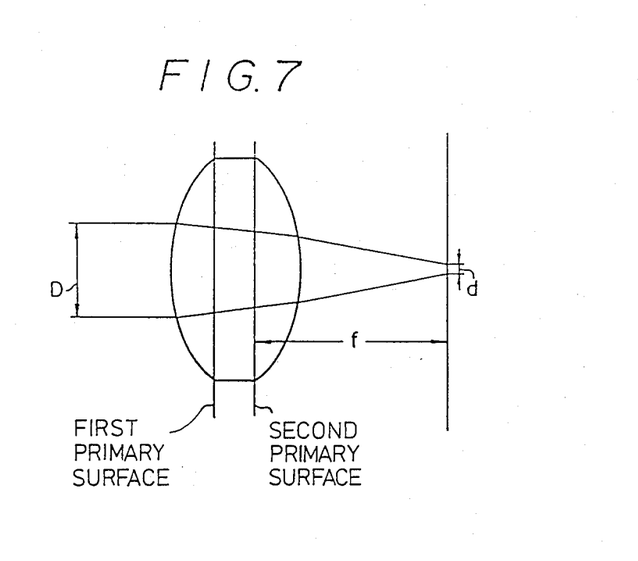
FIG. 7 is a diagram illustrating the operation of the recording apparatus of the present invention.

Referring now to FIG. 7, the relationship as expressed by the following formula (2) is established, where D represents the diameter of the light beam incident to the scanning lens (aperture diameter), $\lambda$ represents the wavelength of the light beam, K represents the proportional constant determined by the ratio between the diameter D and the wavelength $\lambda$, d represents the diameter of dot formed on the recording material and f represents the focal distance of the scanning lens.

$$K \cdot \frac{\lambda}{D} \cdot f = d \qquad (2)$$

From the formula (2) above, the focal distance f of the scanning lens is derived as follows.

$$f = \frac{d \cdot D}{K \cdot \lambda} \qquad (3)$$

As will be understood from the formula (1) above, the diameter D of the incident light beam is contracted at a ratio of $D_1/D_2 = m$ (m<1). Therefore, the focal distance of the scanning lens is reduced to 1/m, as compared with that obtained when the factors K, d and $\lambda$ are constant while the deflection angle of the light beam is not amplified in the direction of the main scan.

According to the invention, it is thus possible to employ a scanning lens having a focal distance smaller than that in conventional system, by virtue of the use of the afocal anamorphic optical system which is capable of amplifying the deflection angle in the direction of the main scan.

To sum up, according to the invention, a large angle of scan in the direction of the main scan can be obtained because the deflection angle is amplified in the direction of the main scan by the afocal anamorphic optical system. This makes it possible to effect the main scan with a light beam which has been deflected by the light deflecting means when the oscillation angle of the light deflecting means is in the minimum region, whereby the tendency for the recorded information to be distorted is suppressed. In addition, the use of the afocal anamorphic optical system enables a scanning lens having a smaller focal distance to be used.

The present invention can be embodied in various forms. In a first form of the invention, the afocal anamorphic optical system serves to amplify, in the direction of the main scan, the deflection angle of the light beam which has been deflected by the optical deflection means and, at the same time, to correct any distortion of the recorded information in the direction of the main scan. The afocal anamorphic optical system can have, upon suitable determination of the values of various factors thereof, distortion characteristics which would compensate for any distortion of the deflected light so as to eliminate distortion of the information recorded on the recording material. Thus, when the light beam deflected by the light deflection means is made to pass through the afocal anamorphic optical system having the above-mentioned distortion characteristics, the deflection angle of the light beam is amplified in the direction of the main scan and, at the same time, the distortion of the deflected light beam is corrected.

Thus, in the described form of the invention, the small distortion component of the light beam from the light deflection means is further reduced as the light beam is made to pass through the afocal anamorphic optical system so as to further reduce the tendency for the recorded information to be distorted. In addition, since the distortion in the direction of the main scan is corrected by the afocal anamorphic optical system, there is no need for the scanning lens to have distortion characteristics which would compensate for the distortion of the deflected light beam in the direction of the main scan, whereby the design of the scanning lens is facilitated.

In a second form of the invention, the recording apparatus has an afocal anamorphic optical system which amplifies, in the direction of the main scan, the deflection angle of the light beam which has been deflected by the light deflection means, and a scanning lens which focuses the light from the afocal anamorphic optical system on the recording material thereby forming image, and at least one of the afocal anamorphic optical system and the scanning lens has arcsine distortion characteristics or distortion characteristics approximating arcsine curve. When the arcsine or approximately arcsine distortion characteristics are realized in the afocal anamorphic optical system, the scanning lens used in combination with this afocal anamorphic optical system preferably is an f.tan $\theta$ lens having characteristics represented by s=f.tan $\theta$, where $\theta$ represents the incident angle of the light beam with respect to the optical system, s represents the distance of the focal point from the optical axis and f represents the focal distance, or a lens which has characteristics approximating s=f.tan $\theta$. When the afocal anamorphic optical system does not have arcsine or approximately arcsine distortion characteristic, an arcsine lens or a lens having characteristics approximately arcsine characteristics is used as the scanning lens. It is also possible to design such that the arcsine or approximately arcsine distortion characteristics are realized by combination between the distortion characteristics of the afocal anamorphic optical system and the distortion characteristics of the scanning lens.

Figure 8A:
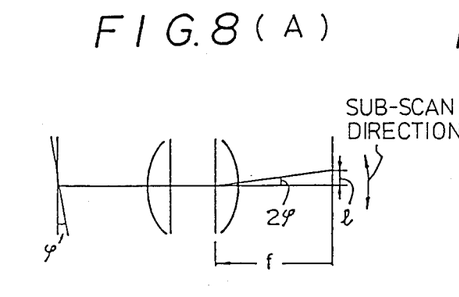
FIGS. 8A, 8B and 9 are illustrations of the relationship between the focal distance of a scanning lens and correction of unevenness of recording density attributable to tilt of light deflection means.
Figure 8B:
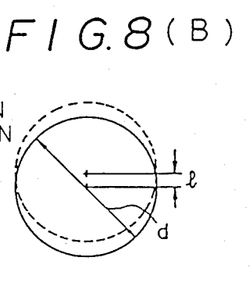

A discussion will be made hereinunder as to how the unevenness of the recording density in the direction of sub-scan attributable to the tilting of the surface of the mirror in the deflection means can be corrected by the use of the f.tan $\theta$ lens. The light beam is not amplified by the afocal anamorphic optical system in the direction of the sub-scan. Referring to FIGS. 8A and 8B, the angle of tilt of the light deflection means is represented by $\phi$. This tilting angle causes the light beam from the f.tan $\theta$ lens to be deflected by 2$\phi$. In consequence, the tilting of the light deflection means causes the center of the dot to be displaced by the following distance l on the recording material.

$$l = f.\tan(2\phi) \qquad (4)$$

Figure 9:
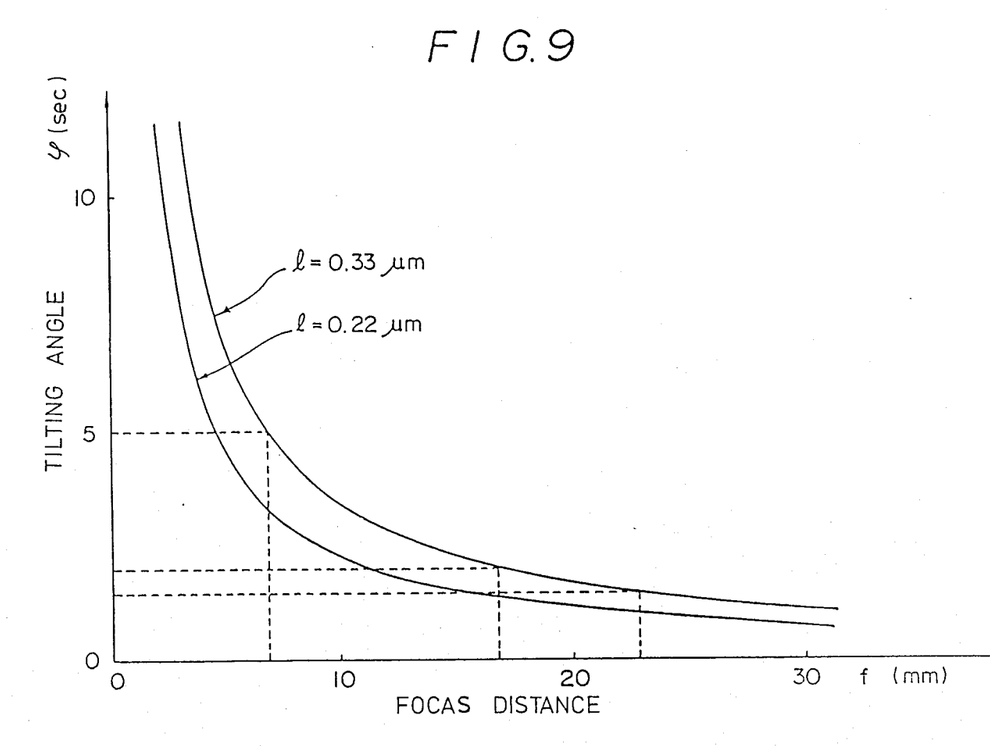

FIG. 9 is a graphical representation of the condition expressed by the formula (4) above, plotted on each condition of l=0.22 $\mu$m and l=0.33 $\mu$m. As will be understood from this Figure, the focal distance of the f.tan $\theta$ lens and the angle of tilt of the deflection means are in inverse proportion to each other. Therefore, the distance 1 is not changed substantially even when the tilting angle is large, provided that the focal distance is selected to be sufficiently small. As described above, the focal distance of the scanning lens can be reduced by increasing the angle of deflection of the light beam in the main scan direction by the use of the afocal anamorphic optical system. It is therefore possible to completely or substantially eliminate the necessity for the correction of unevenness of the recording density attributable to the tilting of the light deflection means.

The above and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the invention will be described hereinunder with reference to the accompanying drawings.

Figure 1A:
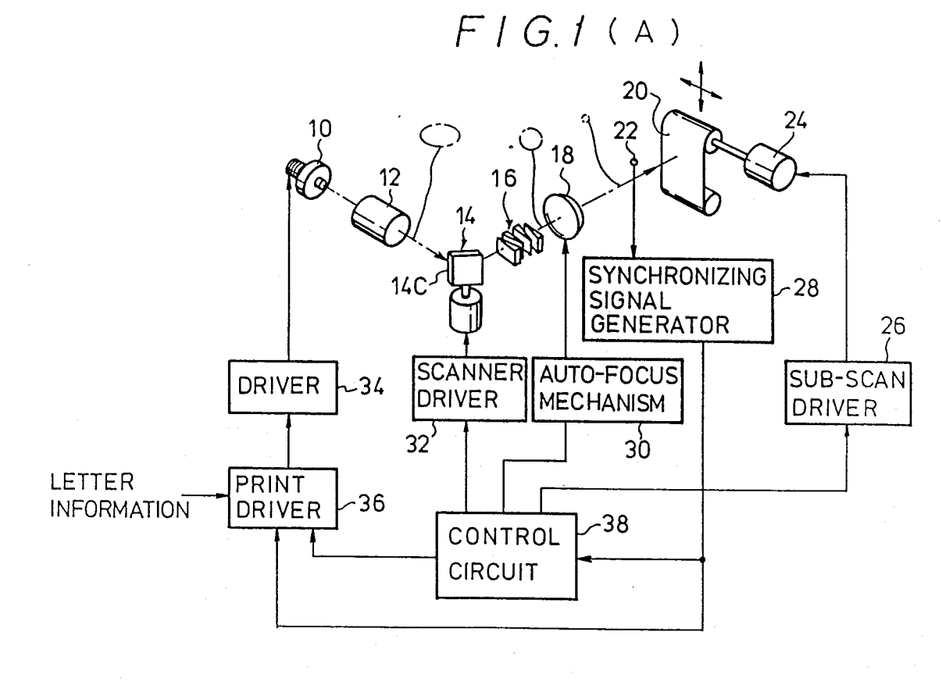
FIG. 1A is a block diagram of an embodiment of the present invention.

FIG. 1A is a block diagram showing an optical system and a control system of a recording apparatus of the invention for recording information in the form of, for example, letters on a microfilm. The optical system is intended for effecting deflection of a laser beam in the direction of main scan, while the control system is designed to control the optical system while controlling the feed of a recording material in the direction of sub-scan at a predetermined speed, thereby enabling the laser beam to scan the area on the recording material.

Figure 2:
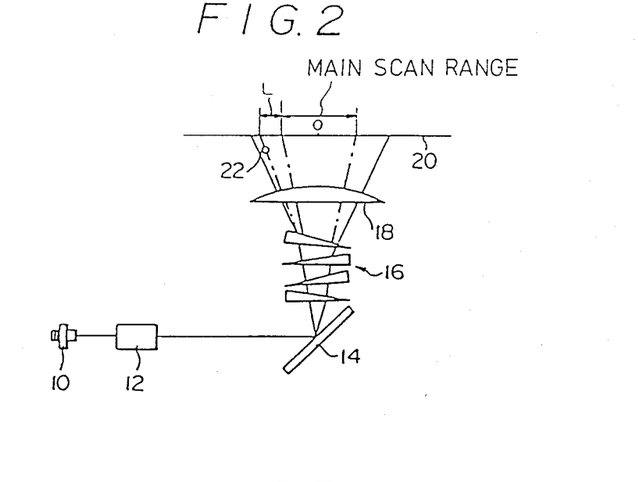
FIG. 2 is a diagrammatic illustration of the optical system in the embodiment shown in FIG. 1A.

The optical system and the control system will be described in more detail with reference to FIGS. 1A and FIG. 2. This optical system has a semiconductor laser 10 capable of emitting a laser beam under a suitable on-off control. At the beam-emitting side of the semiconductor laser 10 is disposed a collimator lens 12 having a beam shaping optical system which collimates the laser beam from the semiconductor laser 10 into a parallel beam while increasing the diameter of the beam in the direction of the main scan. A resonant scanner 14 is disposed at the light emanating side of the collimator lens 12. The resonant scanner 14 has a deflection mirror 14C capable of making resonant oscillation in response to a sine wave oscillation expressed by the following formula (5), thereby deflecting the laser beam in the direction of the main scan.

$$\phi = \phi_o \sin \omega t \quad (5)$$

where, $\phi$ represents the angle of rotation of the deflection mirror, $\phi_o$ represents the amplitude of oscillation, $\omega$ represents the angular frequency and t represents time.

Figure 1B:
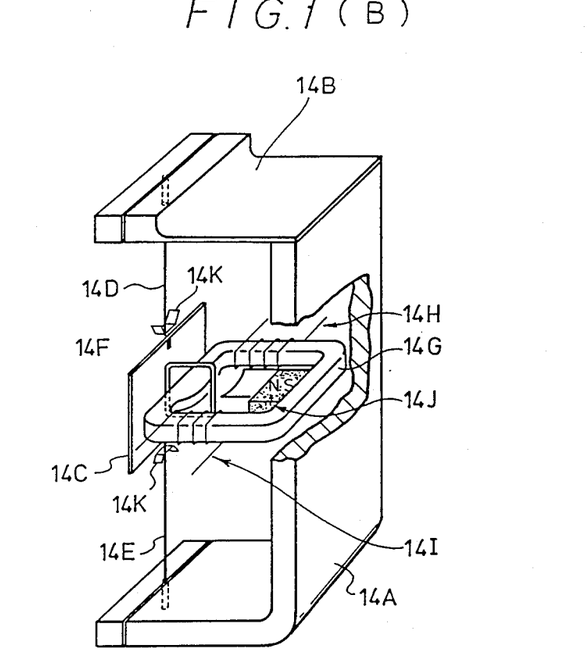
FIG. 1B is a partly removed schematic perspective view of a resonant scanner.

As will be seen from FIG. 1B, the resonant scanner 14 has a main body which includes a leaf spring 14B fixed to one end of an L-shaped member 14A. A mirror 14C is disposed between the upper surface of the bottom of the L-shaped member 14A and the leaf spring 14B. The mirror 14C is connected at its upper side to the leaf spring 14B through a torsion bar 14D and at its lower side to the bottom of the L-shaped member 14A through another torsion bar 14E. An armature coil 14F is fixed to the underside of the mirror 14C. A ring-shaped iron core 14G is disposed such as to extend through the armature coil 14F. Wires are wound on the iron core 14G so as to form a velocity pickoff coil 14H and a drive coil 14I. A reference numeral 14J represents a permanent magnet, while 14K represents a tuning tab. In operation, the mirror 14C oscillated in a sine wave form as the drive coil 14I is energized.

Figure 3:
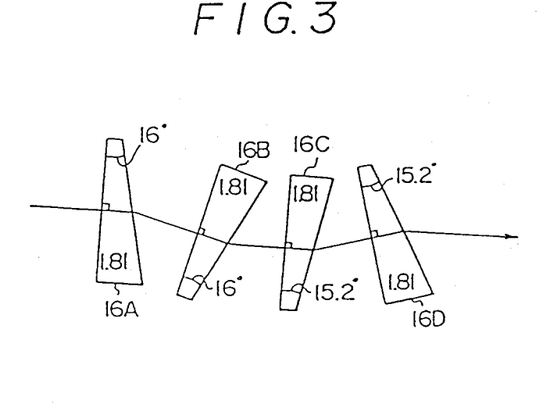
FIG. 3 is a diagrammatic illustration of an afocal anamorphic optical system employing four prisms.

An afocal anamorphic optical system 16 having four prisms is disposed on the beam reflecting side of the resonant scanner 14. More specifically, the afocal anamorphic optical system 16 includes a first prism 16A having an apex angle of 16° and a refractive index of 1.81, a second prism 16B having an apex angle of 16° and a refractive index of 1.81, the second prism 16B having the apex facing the opposite side to the apex of the first prism 16A, a third prism 16C having an apex angle of 15.2° and a refractive index of 1.81, the apex of the third prism 16C facing the same side as the apex of the second prism 16B, and a fourth prism having an apex angle of 15.2° and a refractive index of 1.81, the apex of the fourth prism 16D facing the opposite side to the apex of the third prism 16C. These four prisms 16A, 16B, 16C and 16D are arranged such that a laser beam incident to the prism 16A at a right angle is incident orthogonally to the surfaces of the prisms 16B, 16C and 16D.

It is to be noted that the apex angles and refractive indexes of the prisms shown in FIG. 3 are only the preferable and approximate numerical values which have been obtained experimentally and, therefore, they are not limited to these values in this invention.

Figure 4:
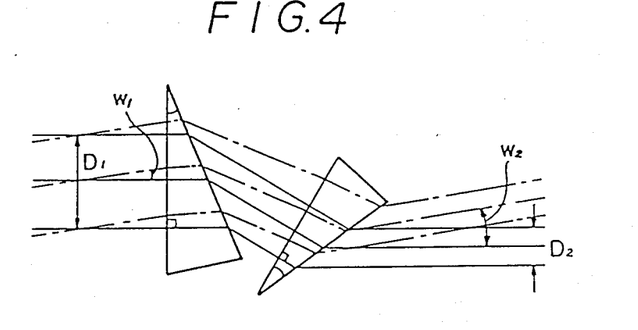
FIG. 4 is a diagram showing amplification of a light beam through an afocal anamorphic optical system.

It is assumed that an afocal anamorphic optical system has a pair of prisms having apices facing opposite directions as shown in FIG. 4. In this optical system, as explained before, a relationship as expressed by the formula 91) exists between the ratio of the diameter $D_1$ of the incident light beam incident to the afocal anamorphic optical system to the diameter $D_2$ of the beam emanating from the same system and the ratio between the angle $\omega_1$ of the light beam incident to the afocal anamorphic optical system with respect to the optical axis and the angle $\omega_2$ of the emanating light beam with respect to the optical system.

As will be understood from formula (1) above, the product of the light beam diameter and the angle of the beam with respect to the optical axis at the incident side of the afocal anamorphic optical system is equal to that at the emanating side of the same optical axis. By making use of this principle, in the illustrated embodiment, the laser beam is made to pass through the afocal anamorphic optical system having four prisms, so that the deflection angle of the laser beam in the direction of the main scan can be sufficiently amplified even when the oscillation angle of the deflection mirror of the resonant scanner 14 is small.

Figure 5A:
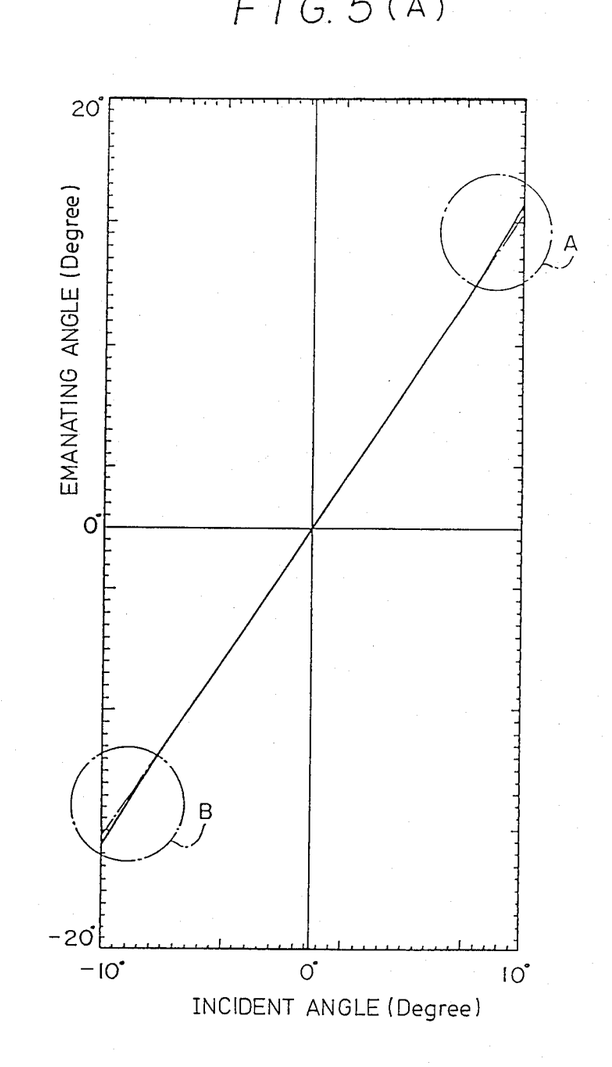
FIG. 5A is a diagram illustrating the change in the angle of light beam emanating from an afocal anamorphic optical system in relation to a change in the incident angle.
Figure 5B:
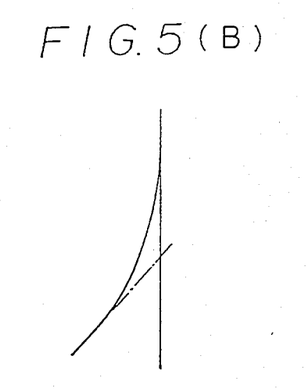
FIGS. 5B and 5C are enlarged views of portions marked at A and B in FIG. 5.
Figure 5C:
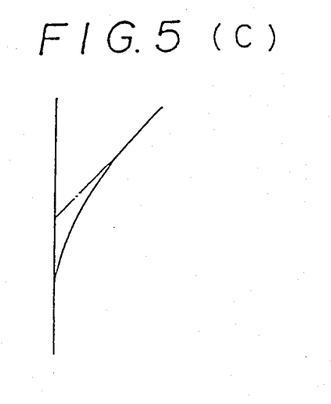

It is also known that an afocal anamorphic optical system having a plurality of prisms can have an arcsine distortion characteristic provided that the apex angles and refractive indexes of the prisms are suitably determined. In the case of the afocal anamorphic optical system shown in FIG. 3 having four prisms having apex angles and refractive indexes described before, the angle of the light beam emanating from the afocal anamorphic optical system with respect to the optical axis varies as illustrated in FIG. 5A, provided that the magnification is 1.5 while the distortion is 2.3%. FIGS. 5B and 5C show, respectively, the portions marked at A and B in a larger scale.

It is a well known and common measure to employ an arcsine lens having arcsine distortion characteristic as shown by formula (6) as the scanning lens, when the optical system includes a resonant scanner having a deflection mirror which resonates in response to sine wave oscillation. The necessity for such arcsine distortion characteristic of the scanning lens, however, is eliminated in the invention because such an arcsine distortion characteristics are realized by the afocal anamorphic optical system itself. The afocal anamorphic optical system having arcsine distortion characteristics is very easy to design because it can be composed of a plurality of prisms.

$$y = 2f \cdot \phi_0 \sin^{-1}\left[\frac{\theta}{2\phi_0}\right] \tag{6}$$

where, y is the distance of the focal point from the optical axis, $\phi$ represents the incident angle of the light beam with respect to the optical axis, and f represents the focal distance.

In the described embodiment, therefore, a scanning lens 18 having characteristics as shown by the following formula (7) is disposed at the light emanating side of the afocal anamorphic optical system 16, such that the recording material 20 is positioned on the focal plane of this scanning lens 18.

$$s = f \cdot \tan \theta \tag{7}$$

where, s represents the distance of the focal point from the optical axis, f represents the focal distance and $\theta$ represents the angle of incidence of the laser beam with respect to the optical axis.

The length of one frame of the microfilm as measured in the direction of the main scan is usually 7.2 mm so that the maximum amplitude of the main scan is 3.6 mm. The magnification (1/m) of the deflection angle of the afocal anamorphic optical system is assumed to be 1.5, while the amplitude $\phi_o$ is assumed to be 10°. Since the image is formed by the afocal anamorphic optical system and the f tan $\phi$ lens so as to meet the condition of the formula (6), the $\phi_o$ in the formula (6) is calculated to be $10° \times 1.5 = 15°$. It is also assumed that the portion of the laser beam emitted from the f.tan $\theta$ lens, which is 50% in terms of scan angle near the optical axis, is used for the purpose of recording. In such a case, the incident angle $\theta$ is calculated to be 15°. Therefore, if the maximum amplitude of the main scan is 3.6 mm as explained before, the focal distance f of the scanning lens is calculated to be f=13.13 mm. Using these values, the distortion $\alpha$ is calculated as follows.

$$\alpha = \frac{\text{maximum amplitude of main scan} - f \cdot \tan \theta}{f \cdot \tan \theta}$$
$$= \frac{3.6 - 13.13 \times 0.2679}{13.13 \times 0.2679} = 0.023$$

whereby the strain $\alpha$ is reduced to 2.3%.

A description will be made hereinunder as to the control system of the recording apparatus. The control system has a photoelectric converter 22 which is disposed between the scanning lens 18 and the recording material 20. As will be seen from FIG. 2, the photoelectric converter 22 is disposed outside the path of light which corresponds to the point of start of the main scan with the laser beam which impinges through the scanning lens 18. More specifically, the photoelectric converter 22 is spaced apart from the above-mentioned path of light by a distance L. The photoelectric converter 22 is connected to a synchronizing signal generator 28 which is adapted to generate a synchronizing signal composed of a train of pulses of a predetermined pulse width, e.g., 3360 dots/7.2 mm, after elapse of a time which is necessary for the laser beam to move the distance L from the moment of receipt of the laser beam from the scanning lens 18 by the photoelectric converter 22. The synchronizing signal generator 28 is connected to a print driver 36 for converting the letter information into dot signals. The print driver 36 is connected to a semiconductor laser driver 34 which conducts an on-off control of the semiconductor laser 10 in accordance with the dot signals output from the print driver 36. This electric circuit has a control circuit 38 composed of a microcomputer. The control circuit 38 is connected through a scanner driver 32 to the driving section of the resonant scanner 14 and also to the scanning lens 18 through an auto-focus mechanism 30. The control circuit 38 also is connected through a sub-scan driver 26 to a motor 24 which is adapted for feeding the recording material 20 in the direction counter to the sub-scan direction. The motor 24 also is adapted to feed the recording material 20 in the direction of the main scan so as to record information on an area of the recording material which is adjacent to the area on which the recording has been completed.

A description will be made hereinunder as to the recording material which is suitable for use in the recording apparatus of the present invention. Examples of the recording material suitably used are silver salt type photographic films, electrophotographic film capable of recording information by electrostatic charges, and heat-mode recording materials. The term "heat-mode recording material" is used in this specification to generally mean recording materials which have a recording layer such as a thin metallic film made of a material capable of melting, evaporating or coagulating when supplied with high density energy such as laser. The recording layer may be formed of a single layer of a metal, a plurality of layers of different metals, a single or a plurality of layers of a mixture of an alloy, and a single or a plurality of layers of dyestuff, pigment or synthetic resin. The recording layer may contain a substance which is effective in enhancing the material for improving the sensitivity in heat-mode recording, or a separate layer is provided for enhancing the sensitivity. It is also possible to provide a protective layer on the recording layer.

These heat-mode recording material can be produced by forming, on a substrate, a recording layer by a suitable method such as evaporation, electroplating, non-electrolytic plating, sputtering, ion plating and so forth.

In general, the heat-mode recording material has a large threshold effect. Namely, recording is impossible to energy of a density below a threshold, but the recording can be effected completely by application of energy of a density which more or less exceeds the threshold level. For instance, a heat-mode recording material suitable for use in the recording apparatus of the present invention can be produced by preparing a substrate of a known material such as a glass or PET, forming by evaporation a recording layer of a metal having a low melting point such as indium or bismuth, and then forming a protective layer on the recording layer. For the purpose of recording information, the laser beam converged to form a tiny beam spot is applied to the surface of this recording material, so that the recording layer is thermally denatured when the intensity of the laser beam exceeds a predetermined threshold. For instance, the metal in the portion irradiated with the beam spot is extinguished to make the recording material transparent, whereby the information is recorded. The heat-mode recording material generally has a low sensitivity so that it is necessary to employ a laser having a large output power and to converge the beam into an extremely tiny spot having a diameter on the order of several tens of microns, thus increasing the light quantity per unit area. The described embodiment, however, employs a semiconductor laser of a small output power with a long wavelength and a small focal depth. In the described embodiment, therefore, makes use of the auto-focus mechanism 30 so that a beam spot of a diameter of 10 microns or so is always formed on the heat-mode recording material.

The operation of this embodiment will be described hereinunder with reference to FIGS. 1 to 6. The control circuit 38 operates to cause, through the scanner driver 32, the deflection mirror of the resonant scanner 14 to resonate in accordance with the sine wave of the formula (5). When the the semiconductor laser 10 operates, a parallel laser beam of a diameter increased in the direction of the main scan is applied to the resonant scanner 14 through the collimator lens 12 and the parallel beam reflected by the resonant scanner 14 impinges upon the afocal anamorphic optical system which serves to reduce the diameter of the beam in the direction of the main scan. The beam is then applied to the recording material 20 through the scanning lens 18. In FIG. 1A, one-dot-and-dash lines show the cross-sectional shapes of the laser beam taken along a plane perpendicular to the optical axis, at the output side of the collimator lens 12, afocal anamorphic optical system 16 and the scanning lens 18.

Figure 6:
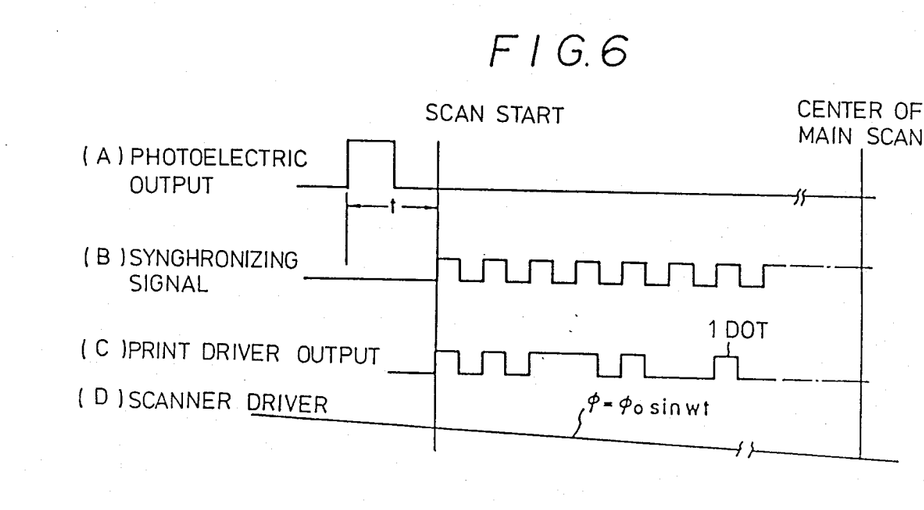
FIG. 6 is a diagram showing the waveforms of the respective portions of a control system in the embodiment described above.

Upon receipt of the laser beam, the photoelectric converter 22 disposed between the scanning lens 18 and the recording material 20 outputs an electric signal as shown at "A" in FIG. 6. This electric signal is delivered to the synchronizing signal generator 28. When a predetermined time t has elapsed from the rise of the above-mentioned electric signal, the synchronizing signal generator 28 generates and outputs a synchronizing signal composed of a pulse train as shown at "B" in FIG. 6. The time t is determined as a function of the angular velocity of the reflection mirror of the resonant scanner 14 and the distance L shown in FIG. 2. The thus output synchronizing signal is input to the print driver 36. The print driver 36 receives the letter information from, for example, a computer (not shown) and converts the letter information into dot patters for each line of the main scan. A dot signal as shown at "C" in FIG. 6 is formed and output on the basis of the dot pattern mentioned above and the synchronizing signal. The high level portions of this dot signal corresponds to parts of letters or characters. The dot signal is supplied through the semiconductor laser driver 34 to the semiconductor laser 10 so that the semiconductor laser 10 is turned on and off in accordance with the dot signal. Thus, when the dot signal is of high level, the semiconductor laser 10 emits the laser beam. The synchronizing signal generated by the synchronizing signal generator 28 also is received by the control circuit 38. Upon receipt of the synchronizing signal, the control circuit 38 the sub-scan driver 26 so as to drive the motor 24 to operate at a constant speed from the moment of commencement of the main scan, thereby effecting the sub-scan. The speed of the sub-scan is typically selected such that the recording material 20 is fed by 2.7 microns during the period of one main scan. The control circuit 38 also operates the auto-focus mechanism 30 so as to automatically control the position of the scanning lens 18 thereby to form a tiny spot of the laser beam on the surface of the recording material 20.

Although in the described embodiment the afocal anamorphic optical system is composed of four prisms, the afocal anamorphic optical system may be constituted by any even number of prisms such as two or six. The even number of prisms are arranged such that half of the prisms and the other half thereof are different in direction where the apex angles of the prisms face from each other with respect to the optical axis, so that the distortions occurring in the direction of the scan can be symmetrized with respect to the optical axis. However, if it is unnecessary to symmetrize the distortions, the number of the prism is not limited to the even number.

Figure 10:
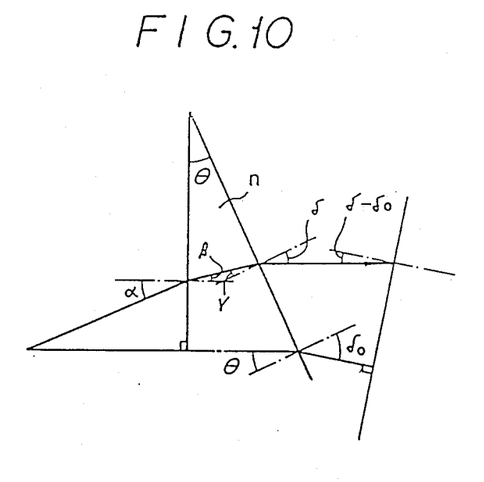
FIG. 10 is a diagram illustrating the incident angle and other factors of a light beam incident to a prism.

Referring to FIG. 10, a prism has an apex angle $\theta$, a refractive index of n, an incident angle of $\alpha$, and an emanating angle of $\delta$. The emanating angle obtained when the incident angle is 0° is expressed by $\delta_o$. In this case, the emanating angles $\delta$ and $\delta_o$ are expressed as follows.

$$\sin \delta = \sin \theta \sqrt{n^2 - \sin^2 \alpha} - \cos \theta \cdot \sin \alpha \tag{8}$$

$$\sin \delta_o = n \cdot \sin \theta \tag{9}$$

The angle of incidence to the next prism $\delta - \delta_o = g(\alpha, \theta, n)$ is represented as follows.

$$g(\alpha, \theta, n) = \sin^{-1} \{\sin \theta \sqrt{n^2 - \sin^2 \alpha} - \cos \theta \cdot \sin \alpha\} - \tag{10}$$

-continued $$\sin^{-1}(n \cdot \sin \theta)$$

On the other hand, the angular magnification $d\delta/d\alpha = f(\alpha, \theta, n)$ is expressed as follows.

$$f(\alpha, \theta, n) = A/B \qquad (11)$$

where, A and B are given as follows.

$$A = \cos \alpha \cdot \cos \theta \sqrt{n^2 - \sin^2 \alpha} + \cos \alpha \cdot \sin \alpha \cdot \sin \theta$$

$$B = \sqrt{n^2 - \sin^2 \alpha} \{1 - n^2 \sin^2 \theta - \cos 2\theta \cdot \sin^2 \alpha + \sin 2\theta \cdot \sin \alpha \sqrt{n^2 - \sin^2 \alpha}\}^{\frac{1}{2}}$$

The angle g $(\alpha_i, \theta_i, n_i)$ to the (i+1)th prism and the angular magnification f $(\alpha_i, \theta_i, n_i)$ of the i-th prism can be obtained by substituting $\alpha_i, \theta_i, n_i$ for $\alpha, \theta, n$ in formulae (10) and (11) above. It is therefore possible to amplify the deflection angle of the laser beam in the direction of the main scan and to impart an arcsine distortion or other necessary distortion characteristics by suitably selecting the values of these parameters.

Figure 11:
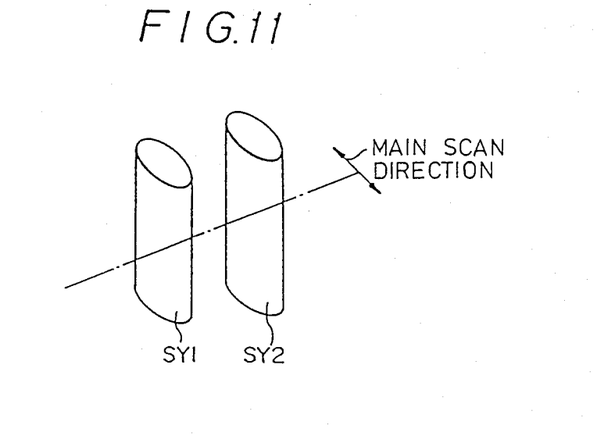
FIG. 11 is a diagrammatic illustration of another afocal anamorphic optical system suitable for use in the recording apparatus of the present invention.

In another embodiment shown in FIG. 11, the afocal anamorphic optical system is constituted by a pair of cylindrical lenses SY1 and SY2, as shown in FIG. 11. It is also to be understood that the sub-scan may be effected by making use of a resonant scanner similar to that used for the main scan, although in the described embodiment the sub-scan is effected by feeding the recording material.

In the described embodiment, an f, tan θ lens is used as the scanning lens in combination with an afocal anamorphic optical system which has an arcsine distortion characteristic. This, however, is only illustrative and the arrangement may be such that an arcsine lens used used as the scanning lens in combination with an afocal anamorphic optical system which has no distortion component. It is also to be understood that the distortion characteristics of the anamorphic optical system or the scanning lens and the image-forming characteristics of the scanning lens described hereinbefore need not be met strictly, and the invention covers such modifications which have distortion characteristics and image-forming characteristics which approximate the above-described characteristics.

As will be understood from the foregoing description, the recording apparatus of the present invention which makes use of a semiconductor laser does not necessitate a photo-modulator which is essentially required in the conventional recording apparatus which employs an argon laser. In addition, the recording apparatus of the present invention eliminates, by virtue of the use of the resonant scanner, the necessity for any correction optical system which is necessary in the conventional apparatus employing a rotary polygon mirror. In addition, the synchronizing signal is formed on the basis of a signal from a photoelectric conversion element, so that the necessity for reference light rays such as helium-neon laser beam is eliminated, thus contributing to a reduction in the production cost. Furthermore, the use of an afocal anamorphic optical system having an arcsine strain characteristic enables an ordinary convexed lens to be used as the scanning lens, thus facilitating the design of the lens. Furthermore, the use of the afocal anamorphic optical system, which amplifies the diameter of the laser beam in the direction of the main scan, enables the scanning to be performed with the portion of the light beam which has been deflected by the deflection means when the angle of oscillation of the deflection means is in the smallest region and, hence, which has only a small distortion component, whereby the distortion of the recorded information is minimized.

Although the described embodiment employs a semiconductor laser which is on-off modulated, this is not exclusive and the recording apparatus may employ an argon laser or other beam source which undergoes an on-off modulation effected by, for example, an acoustic photomodulator. Other types of modulator such as an electrooptical modulator, magnetic-optical modulator and a modulator which makes use of a change in light absorption coefficient may be used equally well. The term "on-off" control or modulation is used to mean that the operation of the laser is controlled such that the energy level is set either one at two levels. Thus, the "off" state does not always mean that the energy level is zero but generally mean an energy level below a threshold level.

What is claimed is:

1. A recording apparatus for recording information with a light beam, comprising:
   a beam source for emitting said light beam;
   light deflecting means for deflecting said light beam from said beam source in the direction of main scan by sine wave oscillation;
   an afocal anamorphic optical system for amplifying, in the direction of the main scan, the deflection angle of said light beam deflected by said deflecting means; and
   a scanning lens through which said light beam from said afocal anamorphic optical system is focused on a recording material.

2. A recording apparatus according to claim 1, wherein said anamorphic optical system has distortion characteristics which compensate for distortion of an image formed on said recording material in the direction of the main scan.

3. A recording apparatus according to claim 1, wherein at least one of said afocal anamorphic optical system and said scanning lens has an arcsine or an approximately arcsine distortion characteristic.

4. A recording apparatus for recording information with a light beam, comprising:
   a beam source for emitting said light beam;
   light deflecting means for deflecting said light beam from said beam source in the direction of main scan by sine wave oscillation;
   an afocal anamorphic optical system for amplifying, in the direction of the main scan, the deflection angle of said light beam deflected by said deflecting means, wherein said afocal anamorphic optical system has an arcsine or an approximately arcsine distortion characteristic, and wherein said scanning lens has an image forming characteristic represented by $s = f \times \tan \theta$ or approximately $s = f \times \tan \theta$, where s represents the distance of the focal point from the optical axis, f represents the focal distance and $\theta$ represents the angle of incidence of the light beam with respect to the optical axis; and
   a scanning lens through which said light beam from said afocal anamorphic optical system is focused on a recording material.

5. A recording apparatus according to claim 1, wherein said afocal anamorphic optical system does not have distortion characteristic while said scanning lens is an arcsine lens or a lens having a characteristic approximating the arcsine characteristic.

6. A recording apparatus according to claim 1, wherein said afocal anamorphic optical system is composed of a plurality of prisms.

7. A recording apparatus according to claim 1, wherein said afocal anamorphic optical system is composed of an even number of prisms.

8. A recording apparatus according to claim 1, wherein said afocal anamorphic optical system is composed of an even number of prisms and the prisms are arranged such that half of said prisms and the other half thereof are different in direction where the apex angles of the prisms face from each other with respect to the optical axis.

9. A recording apparatus for recording information with a light beam, comprising:
   a beam source for emitting said light beam;
   light deflecting means for deflecting said light beam from said beam source in the direction of main scan by sine wave oscillation;
   an afocal anamorphic optical system for amplifying, in the direction of the main scan, the deflection angle of said light beam deflected by said deflecting means, wherein said afocal anamorphic optical system is composed of an even number of prisms, the prisms are arranged such that half of said prisms the other half thereof are different in direction where the apex angles of the prisms face from each other with respect to the optical axis and the light beam incident to the incidence surface of said first prism at a right angle impinges upon the incidence surface of each of the remaining prisms at a right angle, respectively; and
   a scanning lens through which said light beam from said afocal anamorphic optical system is focused on a recording material.

10. A recording apparatus according to claim 1, further comprising sub-scan means for effecting sub-scan of said recording material with said light beam.

11. A recording apparatus according to claim 1, wherein said afocal anamorphic optical system comprises a first prism, a second prism, a third prism and a fourth prism and wherein said first, second, third and fourth prisms are arranged such that the light beam incident to the incidence surface of said first prism at a right angle impinges upon the incidence surfaces of said second, third and fourth prisms at a right angle, respectively.

12. A recording apparatus according to claim 1, wherein said afocal anamorphic optical system includes a pair of cylindrical lenses which are spaced apart from each other by a predetermined distance.

13. A recording apparatus for recording information with a light beam, comprising:
   a semiconductor laser for emitting laser beam;
   a resonant scanner for deflecting said laser beam from said semiconductor laser in the direction of main scan by sine wave oscillation;
   an afocal anamorphic optical system for amplifying, in the direction of the main scan, the deflection angle of said laser beam deflected by said resonant scanner; and
   a scanning lens through which said laser beam from said afocal anamorphic optical system is focused on a recording material.

14. A recording apparatus according to claim 13, further comprising a collimator disposed between said semiconductor laser and said resonant scanner.

15. A recording apparatus according to claim 13, wherein said afocal anamorphic optical system is composed of a plurality of prisms.

16. A recording apparatus according to claim 13, wherein said afocal anamorphic optical system comprises a first prism, a second prism, a third prism, and a fourth prism and wherein said first, second, third and fourth prisms are arranged such that the light beam incident to the incidence surface of said first prism at a right angle impinges upon the incidence surfaces of said second, third and fourth prisms at a right angle, respectively.

17. A recording apparatus according to claim 13 further comprising:
   photoelectric conversion means disposed between said scanning lens and said recording material at a position which is outside the path of the laser beam corresponding to the point of start of said main scan and capable of detecting passage of said laser beam;
   synchronizing signal generating means capable of generating a synchronizing signal composed of a pulse strain of a predetermined length after the passage of said laser beam is detected by said photoelectric conversion means;
   conversion means for converting the information to be recorded into a dot signal in accordance with said synchronizing signal;
   control means for effecting the sine wave oscillation of said resonant scanner and conducting on-off control of the semiconductor laser in accordance with said dot signal; and
   feeding means for feeding said recording material in the direction of sub-scan, 18. A recording apparatus according to claim 13, wherein said afocal anamorphic optical system is composed of a pair of cylindrical lenses which are spaced apart from each other by a predetermined distance.

* * * * *